June 25, 1963 A. WINKLER ETAL 3,094,912
CAMERA WITH AUTOMATIC EXPOSURE-DETERMINING STRUCTURE
Filed May 2, 1962 3 Sheets-Sheet 1

Fig.1

INVENTOR.
ALFRED WINKLER
BY DIETER ENGELSMANN
HUBERT HACKENBERG

United States Patent Office 3,094,912
Patented June 25, 1963

3,094,912
CAMERA WITH AUTOMATIC EXPOSURE-
DETERMINING STRUCTURE
Alfred Winkler, Munich, Dieter Engelsmann, Unterhaching, Munich, and Hubert Hackenberg, Munich, Germany, assignors to Agfa Aktiengesellschaft, Leverkusen, Germany
Filed May 2, 1962, Ser. No. 191,974
Claims priority, application Germany May 19, 1961
14 Claims. (Cl. 95—10)

The present invention relates to cameras.

More particularly, the present invention relates to cameras which are capable of automatically setting those elements of the camera which determine the extent to which film therein is exposed.

Cameras of this type include various parts which are urged by springs to predetermined rest positions, and it is necessary for the operator, when making an exposure, to move all of these parts in opposition to the spring means which act on these parts, so that the operator is required to exert a considerable amount of force each time an exposure is made.

It is accordingly a primary object of the present invention to provide a camera of the above type which requires the operator to exert only an extremely light force when making an exposure, so that it will no longer be necessary for the operator to apply a considerable force to the element of the camera which is actuated in order to make an exposure.

A further object of the present invention is to provide a structure of the above type which is extremely simple and reliable in operation.

Still another object of the present invention is to provide a structure of the above type which will operate with but a single spring under certain conditions and which at the most will require only two springs, so that the structure is not only exceedingly simple but also is very easy to operate with the application of only a small force.

Still another object of the present invention is to provide a structure of the above type with a spring arrangement requiring only an extremely small degree of stressing of the spring arrangement beyond the stress therein when the parts are at rest in order to enable the camera to make an exposure.

Still another object of the present invention is to provide a structure of the above type which can be used, for example, with cameras such as single-lens reflex cameras wherein an element such as a diaphragm of the camera is not moved to its exposure-determining position until just before the shutter itself opens in order to make an exposure.

With the above objects in view the invention includes, in a camera, a manually operable means which is movable from a given starting position to a given end position for tripping a shutter of the camera when this manually operable means is in the region of its end position. An exposure-determining means participates at least partly in the determination of the extent to which film in the camera is exposed, and this exposure-determining means is movable from a given starting position toward a given end position and is operatively connected with a light-responsive means of the camera which acts to limit the movement of the exposure-determining means from its starting position in accordance with the lighting conditions. In accordance with the present invention an elongated spring is located between and connected to the manually operable means and to the exposure-determining means for transmitting movement of the manually operable means to the exposure-determining means, and this spring is under a given stress when both of the above means are respectively in their starting positions. The manually operable means and the exposure-determining means cooperate with the spring for increasing the stress thereof during movement of both of these means from their starting positions, with the result that when the operator releases the manually operable means after the tripping of the shutter of the camera the spring will automatically return both the manually operable means and the exposure-determining means respectively to their starting positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
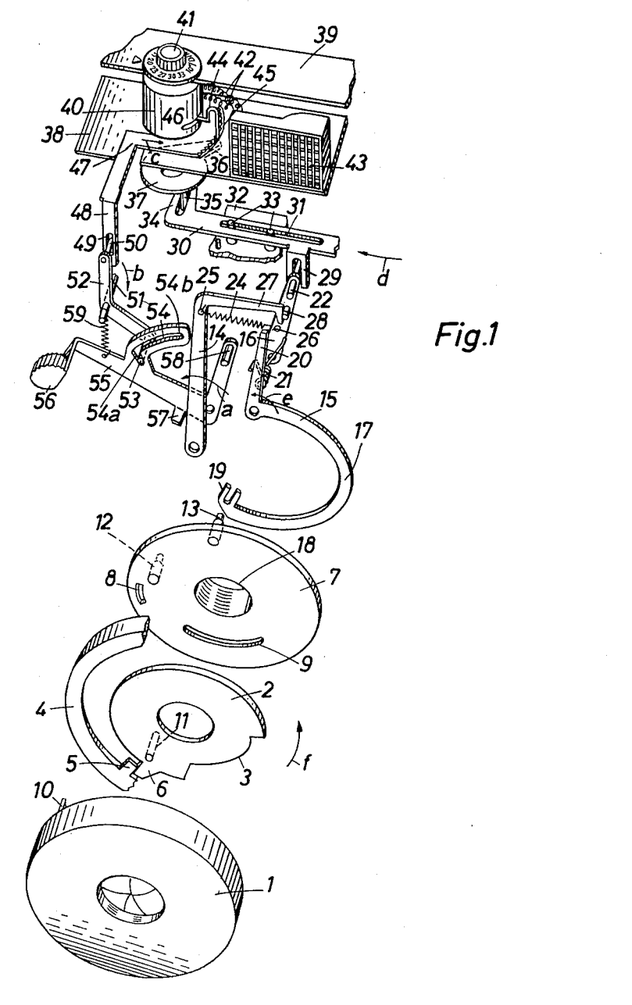
FIG. 1 is an exploded, perspective illustration of one possible embodiment of a structure according to the present invention.

Referring to FIG. 1, there is schematically illustrated therein a shutter housing 1 which houses the shutter and the diaphragm of the camera in a well-known manner. In order to control the extent to which film in the camera is exposed, the housing 1 turnably carries the rotary adjusting member 2 which is provided with a camming portion 3 for an unillustrated lever which cooperates in a known manner with a diaphragm ring of the diaphragm assembly so as to turn this ring in order to set the diaphragm at a position providing the exposure aperture of the camera. The housing 1 also supports for rotary movement a manually turnable ring 4 which is accessible to the operator and which carries a projection 5 engaging a projection 6 of the adjusting ring 2, so that in this way when the operator turns the ring 4 it will be possible to manually set the diaphragm. The angular position of the manually turnable ring 4 can be set in accordance with a scale of diaphragm aperture sizes, this scale being omitted from the drawing since such scales are well-known in the art.

The rear of the housing 1 is closed by a plate 7 which is formed with a pair of arcuate cutouts 8 and 9. A shutter-tripping member 10 extends through the opening 8 rearwardly beyond the wall or plate 7, and when the member 10 is turned downwardly along the slot 8 this member 10 will trip the shutter of the camera in a manner well-known in the art and not forming part of the present invention. A pin 11 which is fixed to the rotary member 2 and which extends parallel to the optical axis passes through the slot 9, and, of course, during turning of the member 2 the pin 11 will move along the slot 9. The plate 7 also carries a pair of pins 12 and 13 which are fixed to the plate 7 and which extend rearwardly therefrom in directions parallel to the optical axis. A lever 14 which forms part of a manually operable means of the present invention is turnably carried at its lower end by the pin 12, while the pin 13 serves to turnably support a lever 15 which forms part of an exposure-determining means of the structure of the invention. The pin 13 also serves to support for turning movement a lever 16. It will be noted that the arm 17 of the lever 15 extends approximately along a semicircle so that it will extend around without ever extending across the opening of the plate 7, this opening 18 serving for the passage of the light which passes through the objective and which is used to expose the film. The free end of the arm 17 of the lever 15 has a bifurcated portion 19 which receives the pin 11 so that the latter pin together with the adjusting ring 2 will necessarily turn when the lever 15 turns about the pin 13. A relatively weak spring 21 is coiled about the pin 13 between the levers 15 and 16 and has its free ends engaging levers 15 and 16 for maintaining the upper arm 20 of the lever 15 in engagement with a pin 22 which is carried by the lever 16. The weak spring 21 thus serves to interconnect the levers 15 and 16 for movement together as a unit except under conditions described below, and except under these latter conditions the levers 15 and 16 both form part of the exposure-determining means of the invention which at least partly determines the extent to which film in the camera is exposed.

In accordance with the present invention a spring means extends between and is connected to the above-referred-to manually operable means and exposure-determining means, and in the embodiment of FIG. 1 this spring means is formed by the spring 24 which is connected at 25 and 26 to the levers 14 and 16, respectively, this spring 24 being under a certain initial tension when the parts are in their rest or starting positions. The lever 14 of the manually operable means has an extension 27 which is urged by the spring 24 into engagement with a pin 28 carried by the lever 16, and the engagement between the extension 27 and the pin 28 provides a predetermined point of engagement between the manually operable means and the exposure-determining means for a purpose described below.

In a manner which is described below, the lever 14 of the manually operable means is turned from the illustrated starting position in the direction of the arrow $a$, and the spring 24 will cause the lever 16 to follow this movement of the lever 14 maintaining the pin 28 in engagement with the extension 27 of the lever 14. Thus, the extension 27 determines the distance between the levers 14 and 16 while the lever 16 follows the lever 14 due to the transmission of movement to the lever 16 by the spring 24. In accordance with the invention the parts are so arranged that during this turning of the lever 14 in the direction of the arrow $a$ shown in FIG. 1 the distance between the points 25 and 26 gradually increases so that the tension on the spring 24 increases, and as a result when the parts are released the spring 24 will automatically return them to their starting position. In the illustrated starting position the spring 24 has a certain tension and would continue to move the parts somewhat beyond the position illustrated in FIG. 1 except that the lever 15 by cooperation with the pin 11 locates the ring 2 in an end position of the diaphragm beyond which the parts cannot move, so that in this way the parts are located in their illustrated starting position. In the particular example illustrated in FIG. 1, the distance between the point of connection 25 of the spring 24 to the lever 14 and the turning axis of the lever 14 provided by the pin 12 is greater than the distance between the point of connection 26 between the spring 24 and the lever 16 and the turning axis of the latter provided by the pin 13. Moreover, the ratio of the distance between the point 25 and the axis of the pin 12 to the distance between the point of engagement between levers 14 and 16, at the place where extension 27 engages pin 28, from the turning axis of the lever 14 provided by the pin 12 is greater than the ratio between the distance of the point 26 and the axis provided by pin 13 to the distance between the point of engagement between parts 27 and 28 and the turning axis of lever 16 provided by the pin 13. In the example of FIG. 1, it is this relationship between the parts which provides the gradual increase of the distance between points 25 and 26 during turning of the lever 14 in the direction of the arrow $a$ so as to provide the gradual increase in the tension of the spring 24 which stores in the latter a force which will return the parts to their starting positions.

The pin 22, which is engaged by the arm 20 of the lever 15 in the manner described above as a result of the action of the spring 21, extends through and beyond the lever 16 into a bifurcated portion 29 of an elongated slide member 30 which is formed with an elongated slot 31 receiving a pair of pins 33 carried by a stationary part 32 of the camera, so that in this way the slide member 30 is guided for movement along a straight line to the right and left, as viewed in FIG. 1. The slide member 30 carries an additional bifurcated portion 34 which receives the pin 35 which is fixed to a rotary scanning disc 37 which has a scanning portion 36. Thus, the assembly 29–37 forms a scanning means which forms part of a light-responsive structure of the camera and which cooperates with the exposure-determining means, which includes the levers 15 and 16, for limiting the extent of movement of this exposure-determining means in accordance with the lighting conditions, as will be apparent from the description which follows.

The rotary scanning disc 37 is supported for rotary movement by an unillustrated pin, and above the scanning disc 37 is located, between a stationary plate 38 and the upper wall 39 of the camera, a meter 40 which may be a galvanometer. This meter 40 is capable of having its angular position adjusted in a well-known manner by manipulation of the knob 41 which is accessible at the exterior of the camera, and this angular adjustment of the meter 40 is used to introduce into the camera the factor of the speed of the film which is used therein, as is well-known in the art. The meter 40 is electrically connected through the electrical conductors 42 with a photosensitive means 43 on which the light impinges, this photosensitive means 43 being, for example, a photocell. The rotor of the galvanometer 40 carries a pointer 44 which turns with the rotor so that the angular position of the pointer 44 is indicative of the lighting conditions, and the pointer 44 has a free downwardly directed elongated end portion which is movable along an arcuate gap formed between a curved edge 45 of the plate 38 and the teeth 46 which are arranged along a corresponding curve and are located at an edge of a slide plate 47 guided for movement to the right and left on the plate 38 through any suitable means such as a pin-and-slot guide similar to the guide structure 31, 33 for the slide 30.

The slide member 47 has a downwardly directed arm 48 formed with a vertical slot 49 which receives a pin 50 which is fixed to a lever 52, in the form of a bell crank, which is turnable about the stationary pin 51 carried by any suitable stationary part of the camera. The lever 52 carries an additional pin 53 which is received in a slot 54 which is formed in a lever 55 which in the embodiment of FIG. 1 also forms part of the manually operable means, this lever 55 being supported for turning movement by the pin 12, so that the levers 55 and 14 have a common turning axis. The slot 54 has a portion 54a which extends substantially radially with respect to the pin 12 and which serves to turn the lever 52 during an initial increment of turning movement of the lever 55, and joining the portion 54a, the slot 54 has an arcuate portion 54b extending along a circle whose center is in the axis provided by the pin 12, so that the pin 53 after being displaced along the slot portion 54a will reach the slot portion 54b and will remain in the latter without further turning of the lever 52 while the lever 55 is turned to displace the slot portion 54b along the pin 53. The lever 55 has a finger-piece 56 accessible at the exterior of the camera so that the operator may engage the finger-piece 56 for turning the lever 55. Moreover, the lever 55 carries a lug 57 which extends angularly from the remainder of the lever 55, and the shutter-tripping member 10 is located in the path of movement of the lug 57, so that when the lever 55 has been turned through a sufficient distance the lug 57 will engage the member 10 in order to trip the shutter of the camera. The lever 55 also fixedly carries a pin 58, and the lever 14 is in the path of movement of the pin 58 so that after the lever 55 moves from the illustrated starting position thereof in the direction of the arrow $a$ of FIG. 1 through a given initial increment of movement, the pin 58 will engage the lever 14 and thereafter the levers 55 and 14 will turn as a unit during movement of the manually operable means 14, 55 subsequent to this initial increment of movement thereof. The parts 52, 47 form a releasable holding means which is movable from the illustrated release position releasing the pointer 44 for movement to a holding position where the teeth of the slide plate 47 engage the pointer 44 and hold it against the edge 45 to prevent movement of the pointer, and a relatively weak spring 59 is connected to the lever 55 for urging it to the illustrated starting position where the lever 55 cooperates through its slot 54 and the pin 53 with the releasable holding means 52, 47 for placing the latter in its illustrated position releasing the pointer 44 for movement.

When it is desired to make an exposure with the above-described structure of FIG. 1, the operator will first actuate the manually operable means 55, 14 for moving the latter from the illustrated starting position thereof to a given end position, and in so doing the operator will engage and depress the finger-piece 56 so as to turn the lever 55 in the direction of the arrow a. During the initial increment of movement of the lever 55 about the pin 12 the slot portion 54a will cooperate with the pin 53 for turning the lever 52 in the direction of the arrow b, thus causing the pin 50 by cooperation with the slot 49 to displace the slide plate 47 in the direction of the arrow c shown in FIG. 1, and in this way the teeth 46 will engage the pointer 44 and hold the latter against the edge 45 of the plate 38, so that the releasable holding means 47, 52 now holds the pointer 44 against movement, and of course just before the movement of the pointer 44 was arrested this pointer automatically assumes a position in accordance with the lighting conditions. This sequence of operation of the elements guarantees that the releasable holding means holds the pointer 44 against movement before the scanning means can move to a position engaging the pointer 44.

The continued turning of the lever 55 in the direction of the arrow a will cause the slot portion 54b to become displaced with respect to the pin 53 which does not move at this time, and thus the releasable holding means 47, 52 is maintained in its holding position during the subsequent movement of the manually operable means 55, 14. However, after the slot portion 54b has reached the pin 53, which is to say when the outer end of the slot portion 54a reaches the pin 53, the pin 58 of the lever 55 engages the lever 14 so that the latter now turns together with the lever 55 in the direction of the arrow a. The spring means 24 now serves to transmit turning movement of the lever 14 to the lever 16, so that the latter follows the lever 14 while the pin 28 remains in engagement with the extension 27, and as a result the pin 22 acts on the scanning means 29–37 for moving the slide member 30 thereof in the direction of the arrow d, and this will result in cooperation of the slide member 30 with the pin 35 for turning the disc 37 in a direction which places the scanning portion 36 in engagement with the pointer 44. It will be noted that while the scanning means is thus moved through the lever 16 as a result of motion transmitted to the latter by the spring 24, the pin 22 also acts on the arm 20 of the lever 15 so that the latter also turns about the pin 13 together with the lever 16, and as a result during the approach of the scanning portion 36 of the scanning disc 37 toward the pointer 44 the pin 11 and the diaphragm adjusting ring 2 are constantly turning so that the aperture of the camera is being automatically set at this time. The exposure-determining means 15, 16 thus moves from the illustrated starting position toward a given end position which is determined by the end position of the diaphragm opposite to that which will be provided by the position of the parts shown in FIG. 1, and the movement of the exposure-determining means 15, 16 will be limited by engagement of the scanning means 29–37 with the pointer 44, so that the scanning means limits the extent to which motion can be transmitted by the spring 24 to the exposure-determining means 15, 16. In this way a light-responsive means formed by the above-described releasable holding means 47, 52, scanning means 29–37, and the light meter 40 and photosensitive means 43, cooperates with the exposure-determining means 15, 16 for limiting the movement thereof from its illustrated starting position in accordance with the lighting conditions, and thus in the illustrated example the diaphragm will be automatically set according to the lighting conditions. Of course, the parts are so designed that irrespective of the lighting conditions the scanning means will engage the pointer of the light meter before the lug 57 reaches the shutter-tripping member 10, which is to say before the manually operable means 55, 14 reaches its end position. Since the spring 21 maintains the arm 20 of the lever 15 in engagement with the pin 22, the levers 15 and 16 turn as a unit and of course when the turning of the lever 16 is terminated by engagement of the scanning means with the pointer of the light meter the turning of the lever 15 is also terminated.

-The operator will of course continue to turn the lever 55 after the movement of the exposure-determining means 15, 16 is terminated in the above-described manner, and at this time the lever 16 will no longer be able to follow the lever 14, so that from the moment when the scanning means engages the pointer of the light meter the continued turning of the manually operable means 14, 55 results in movement of the extension 27 away from the pin 28 and in stretching of the spring 24 at a rate greater than the rate of stretching thereof during turning of levers 14 and 16 while the pin 28 of the latter engages the extension 27. In the region of the end of the movement of the manually operable means 14, 55, the lug 57 engages the shutter-tripping means 10 to move the latter and thus trip the shutter in order to make the exposure.

When the exposure has been made in the above-described manner, the operator will release the finger-piece 56, so that the spring 59 will now return the lever 55 to its starting position and the return of the lever 55 to its starting position causes, through cooperation of the slot 54 and the pin 53, the releasable holding means 52, 47 to return to its release position so that the pointer 44 is now released for movement. Simultaneously with the return of the lever 55 to its starting position, the spring 24 acts on the lever 14 to swing the latter back toward the lever 16 until the extension 27 engages the pin 28, and then because of the force which has been stored in the spring 24 during turning of the manually operable means from its starting position, this spring 24 will automatically return the parts to the illustrated starting positions thereof shown in FIG. 1, in the manner described above, and it will be noted that the return of the lever 16 to its starting position results in movement of the slide member 30 in a direction opposite to that indicated by the arrow d, so that the scanning means 29–37 also returns to its rest position, and furthermore the spring 21 maintains the arm 20 in engagement with the pin 22 so that the ring 2 also returns to its starting position.

The only purpose of the spring 21 in the structure shown in FIG. 1 is to be able to provide manual setting of the ring 2 by manual turning of the ring 4. Thus, because of the presence of the spring 21 it is possible for the operator to turn the ring 4, and the ring 2 therewith, in the direction of the arrow f, and in this way the diaphragm may be manually set. During this turning of the ring 4 and the adjusting ring 2 therewith, the pin 11 will move along the slot 9 and will turn the lever 15 in the direction of the arrow e, so that the only result will be that the arm 20 will be displaced in opposition to the spring 21 away from the pin 22, so that none of the other structure will be influenced by the manual setting of the diaphragm, and because the spring 21 is relatively weak the turning of the arm 20 in opposition to the spring 21 will not stress the latter to an extent sufficient to turn the lever 16 together with the arm 20. Where the camera is so constructed that there is no provision for manual adjustment through manual turning of the ring 4, the spring 21 can be eliminated and the arm 20 can be connected to the lever 16 for turning movement therewith at all times, as by providing a pin-and-slot connection between the arm 20 and the lever 16.

While in the example described above the light-responsive means together with the exposure-determining means determines the setting of a diaphragm of the camera, it is of course also possible to use the same structure for setting the exposure time rather than the exposure aperture, or for setting both the exposure time and the exposure aperture simultaneously, as is well-known in the art. For this purpose the adjusting ring 2 can in a known way cooperate with structure which regulates both the exposure time and the exposure aperture, or the camming edge 3 may be used to set the retarding mechanism of the exposure time determining structure, in the case where only the exposure time is to be automatically determined.

With the above-described structure of FIG. 1, the operator need only oppose the force of the spring 59 and the force required to provide a relatively slight stretching of the spring 24 up until the moment when the scanning means engages the pointer of the light meter so as to terminate the adjustment of the exposure-determining structure of the camera, and therefore the major part of the energy required to operate the camera is used only to oppose the relatively weak spring 59 as well as the practically negligible frictional resistance of the parts to movement. It is only after the scanning means engages the light meter pointer 44 that the spring 24 is elongated at a rate greater than the relatively slight rate of elongation taking place until the extension 27 moves away from the pin 28, so that until the moment when the scanning means engages the light meter pointer only an exceedingly small force is required from the operator, and the extent of elongation of the spring 24 after the extension 27 moves away from the pin 28 is relatively slight so that for this purpose the amount of energy required of the operator is not appreciably increased. Since the levers 15 and 16 remain in engagement except when the ring 4 is manually turned, the operator need not provide energy to overcome the force of the spring 21 inasmuch as this spring does not have any increase in its stressing during automatic operation of the camera. It will be noted that with the above-described structure of FIG. 1 there are no springs which work one against the other and which very greatly increase the force required from the operator in other cameras.

Figure 2:
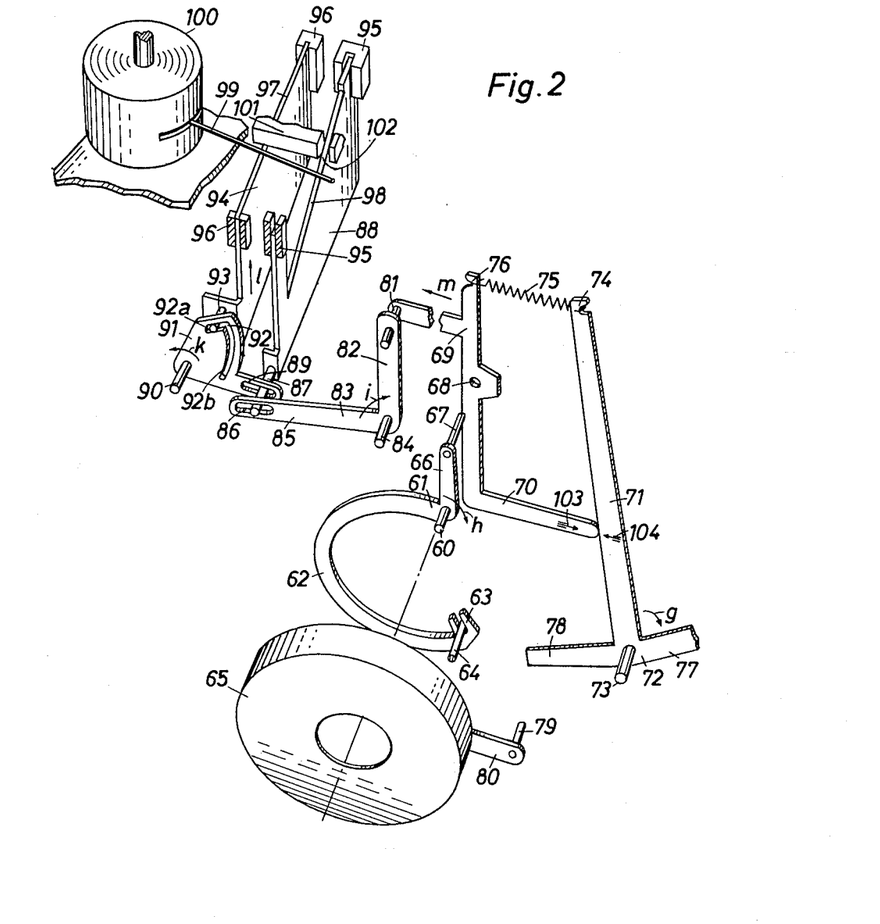
FIG. 2 is a fragmentary exploded perspective illustration of another embodiment of a structure according to the present invention.

The embodiment of the invention which is illustrated in FIG. 2 is considerably simplified as compared to FIG. 1, and in addition there is a saving of springs, inasmuch as the embodiment of FIG. 2 requires but one spring, this one spring corresponding to the spring 24. The embodiment of FIG. 2 does not include any springs corresponding to the springs 59 and 21.

Referring to FIG. 2, it will be seen that the embodiment of the invention illustrated therein includes lever 61 corresponding to the lever 15 and forming part of the exposure-determining means. The lever 61 is turnable about a stationary pin 60 and at its free end the lever 61 is provided, at the end of the arm 62 thereof, with a bifurcated portion 63 receiving the pin 64 of an unillustrated adjusting member turnable within the shutter housing 65 and capable of adjusting at least one of the factors which determine the extent to which film in the camera is exposed, such as the factor of exposure aperture or the factor of exposure time, and the pin 60 is connected to the rear of the shutter housing 65 in the same way as the pin 13 described above, the pin 64 extending through a slot similar to the slot 9 of FIG. 1. The other arm 66 of the lever 61 of the exposure-determining means fixedly carries a pin 67 received in the opening 68 of a motion-transmitting member 69 so that in this way the motion-transmitting member 69 is turnably connected with the free end portion of the arm 66 of the lever 61. The motion-transmitting member 69, which also forms part of the exposure-determining means together with the lever 61, has an extension 70 which engages an arm 71 of the manually operable means of FIG. 2 which is formed by the lever 72 which is supported for turning movement by a stationary pivot pin 73 carried by any suitable part of the camera. A spring 75 extends between and is connected at 76 and 74 respectively to the exposure-determining means 61, 69 and the manually operable means 72, and this spring 75 urges the extension 70 into engagement with the arm 71 of the lever 72, so that in the embodiment of FIG. 2 the exposure-determining means and the manually operable means also have portions engaging each other at a predetermined point of the engagement, as is apparent from the point of engagement between the right end of the extension 70 and the left edge of the arm 71, as viewed in FIG. 2. In the illustrated example the distance between the point of connection 74 of the spring 75 to the arm 71 of the lever 72 and the turning axis of the lever 72 provided by the pin 73 is greater than the distance between the point of engagement between the extension 70 and the arm 71 and the turning axis provided by the pin 73.

The fragmentarily illustrated arm 77 of the lever 72 which forms the manually operable means of FIG. 2 carries at its outer free end a finger-piece so that the operator can turn the lever 72 in a manner described below. This lever 72 has a third arm 78 in the path of turning of which, when the lever 72 is turned from the illustrated starting position thereof toward a given end position in the direction of the arrow g shown in FIG. 2, is located the pin 79 of a shutter-tripping lever 80, this lever being carried by the shutter housing 65 and operatively connected in a known way to the shutter for tripping the shutter when the lever 80 is turned by engagement of the arm 78 with the pin 79 during turning of the lever 72 in the direction of the arrow g, so that when the manually operable means 72 is turned by the operator from its illustrated starting position to its end position the shutter will be tripped when the manually operable means 72 is in the region of its end position.

The motion-transmitting member 69 fixedly carries a pin 81 received in an opening of an arm 82 of a bell crank lever 83 which is supported for turning movement by a stationary pin 84 carried by any suitable part of the camera. The other arm 85 of the bell crank lever 83 is formed with an elongated slot 86 receiving a pin 87 which is fixed to a scanning plate 88. The pin 87 also passes through an elongated slot 89 which is formed in a rotary member or lever 91 which is supported for turning movement about a stationary pin 90 carried by any suitable part of the camera. The rotary member 91 has formed therein a slot 92 similar to and operating on the same principle as the slot 54 described above. The slot 92 receives a pin 93 which is fixed to a holding plate 94 which forms the releasable holding means of FIG. 2. The portion 92a of the slot 92 cooperates with the pin 93 for displacing the holding plate 94 from its release to its holding position during turning of the rotary member 91 in the direction of the arrow k, and when the end of the slot portion 92a reaches the pin 93, this latter pin 93 will be received in the arcuate slot portion 92b which extends along the circle whose center is in the axis of the pin 90, so that during the continued turning of the member 91 while the pin 93 is received in the slot portion 92b, the plate 94 will not be moved but will be retained in its position holding the pointer of the light meter against movement. A pair of guide members 95 cooperate with the scanning plate 88 to guide the latter for vertical sliding movement in its own plane, and a pair of similar guiding members 96 cooperate with the holding plate 94 to guide the latter for vertical movement in its own plane between its holding and releasing positions. The light-responsive means includes the meter 100 which may be identical with the meter 40 and which includes the pointer 99 which can assume positions according to the lighting conditions, and at all times the pointer 99 is located over the edge 97 of the holding plate 94 as well as over the scanning edge 98 of the scanning plate 88, this scanning edge 98 being inclined or curved according to the operating characteristics of the meter 100. A stationary plate 101 is located at all times over the pointer 99 and closely adjacent thereto, so that the edge 97 only deflects the pointer 99 through a slight distance in order to hold it against the stationary plate 101, and this plate 101 is formed with an elongated slot 102 into which the scanning plate 88 can move freely so that irrespective of the position of the pointer 99, the scanning edge 98 can move into engagement therewith, the plate 101 being shown only fragmentarily in FIG. 2 so that the remaining parts can be clearly illustrated.

The parts are shown in FIG. 2 in the rest position they assume when the camera is not actuated to make an exposure. Assuming that the operator wishes to make an exposure, the operator will turn the manually operable means 72 about the pin 73 in the direction of the arrow g, and the movement of the arm 71 will at this time be transmitted through the spring 75 to the motion-transmitting member 69 which thus has its extension 70 maintained in engagement with the lever 71 while the latter turns in the direction of the arrow g. This movement of the motion-transmitting member 69 of the exposure-determining means along with the lever arm 71 results in turning of the lever 61 of the exposure-determining means in the direction of the arrow h, and also this movement of the motion-transmitting member 69 through the spring 75 causes turning of the bell crank lever 83 in the direction of the arrow i about the pin 84. The adjusting member which is actuated by the turning of the pin 64 is so constructed that during an initial increment of movement of the pin 64 there will be no adjustment of the camera. Thus, neither the exposure time nor the aperture will be set during an initial increment of movement of the pin 64. The length of this initial relatively small increment of movement is such that the lever 83 at this time can turn in the direction of the arrow i of FIG. 2 through an angle sufficient to turn the rotary member 91 in the direction of the arrow k until the slot portion 92a cooperates with the pin 93 to place the releasable holding means 94 in its holding position holding the pointer 99 against the plate 101, so that the pointer 99 is arrested during this initial increment of movement when no adjustment of the camera takes place. Thus, with this construction also the manually operable means 72 will have a corresponding initial increment of movement during which it acts through the train of elements illustrated in FIG. 2 on the releasable holding means to place the latter in its position holding the pointer of the light meter against movement. At this time the plate 94 is moved upwardly in the direction of the arrow l into engagement with the pointer 99 to hold the latter stationary. The scanning plate 88 also moves upwardly in the direction of the arrow l simultaneously with the holding plate 94, but the scanning edge 98 is so positioned that only one end thereof reaches the elevation of the pointer 99 when the holding edge 97 of the holding plate 94 engages the pointer 99 and places it in engagement with the stationary plate 101. The further turning of the manually operable means 72 beyond the above-described initial increment of movement thereof acts through the spring 75, the motion-transmitting member 69, and the lever 83 on the pin 87 to continue the upward movement of the scanning plate 88 until its scanning edge 98 engages the pointer 99. Of course the position of the holding means 94 does not change at this time inasmuch as the pin 93 is received in the arcuate portion 92b of the slot 92, the rotary member 91 continuing to turn in the direction of the arrow k while the scanning plate 88 moves upwardly until its edge 98 engages the pointer 99. As long as the scanning plate 88 continues to move upwardly, the lever 61 continues to turn in the direction of the arrow h, and the pin 64 turns so that the exposure-determining structure within the housing 65 is continuously adjusted until the moment when the scanning edge 98 engages the pointer 99. Upon engagement of the scanning edge 98 with the pointer 99, the plate 88 can no longer move upwardly, and thus the lever 83, the lever 61, and the motion-transmitting member 69 cannot move further. The continued turning of the lever 72 by the operator in the direction of the arrow g about the pin 73 moves the arm 71 away from the extension 70 while tensioning the spring 75 beyond the relatively small increase in the tension thereof during movement of the parts until the edge 98 engages the pointer 99. With the structure shown in FIG. 2 and described above, during turning of the manually operable means 72 in the direction of the arrow g from the illustrated starting position thereof the distance between the points 74 and 76 increases so as to increase the tension of the spring 75, but the rate of increase of the tension of the spring 75 increases from the moment when the lever 71 moves away from extension 70. In the region of the end position of the manually operable means 72, its arm 78 engages the pin 79 to turn the shutter-tripping lever 80 so that the shutter of the camera is tripped in order to make the exposure. Of course, the arm 78 will not engage the pin 79 until the edge 98 has engaged the pointer 99, irrespective of the lighting conditions.

After the exposure has been made, the operator releases the manually operable means 72 and the spring 75 operates to immediately swing the lever 72 back to the position where its arm 71 engages the extension 70 of the motion transmitting member 69. At this time there will be at the point of engagement between the extension 70 and the arm 71 a force acting in the direction of the arrow 103 and equal only to the force of the spring 75, while in the opposite direction, indicated by the arrow 104, there will be a larger force equal to the force of the spring 75 multiplied by the length of the lever arm 71 between its turning axis provided by the pin 73 and the point of connection 74 of the spring 75 to the arm 71, this latter distance being divided by the distance between the point of engagement between extension 70 and arm 71 and the turning axis provided by the pin 73. In other words the force acting in the direction of the arrow 104 is the force of spring 75 multiplied by the distance between the pin 73 and the point 74 divided by the distance between the pin 73 and the point of engagement between extension 70 and arm 71. As a result the spring 75 acts to return the manually operable means 72 to its starting position as well as to move the motion-transmitting member 69 in the direction of the arrow m, and this will result in returning the bell crank lever 83 to its starting position so that the scanning plate 88 is lowered to its initial position and at the same time the slot 92 cooperates through the pin 93 with the holding plate 94 to return the latter also to its starting position. Of course, the movement of the motion-transmitting member 69 in the direction of the arrow m will also cause the lever 61 to turn in the direction which returns the pin 64 to its initial position.

Figure 3:
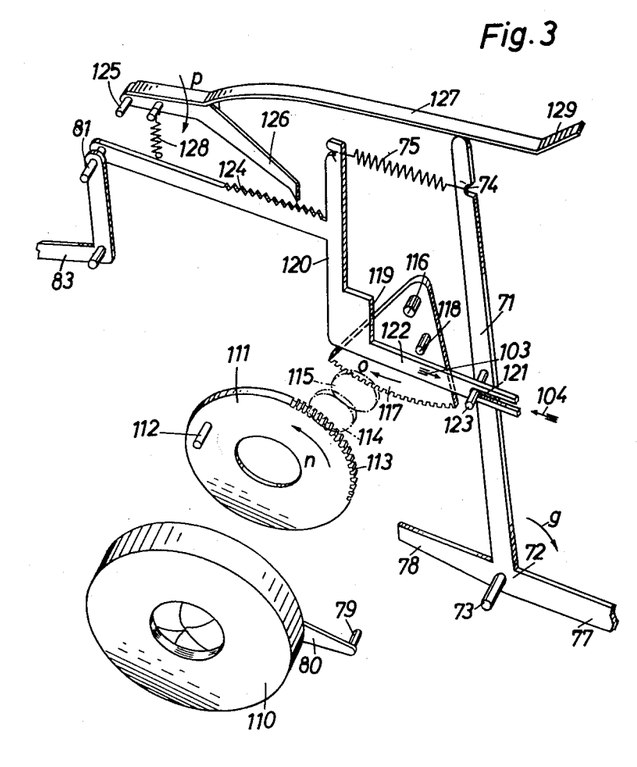
FIG. 3 shows the structure of FIG. 2, in part, modified in order to be capable of being used in a camera such as a single-lens reflex camera.

The embodiment of the invention which is illustrated in FIG. 3 operates on the same principle as the embodiment of FIG. 2. However, the embodiment of FIG. 3 differs from that of FIG. 2 only in that the structure is adapted to be used with that type of camera where the exposure-determining structure is set into operation immediately before the shutter is released. For example, in a single-lens reflex camera when the shutter is actuated, before the shutter is actually tripped in order to make the exposure the diaphragm is automatically set, as is well-known in the art.

In the embodiment which is illustrated in FIG. 3, a rotary ring 111 is carried by the shutter housing 110, and a pin 112 which is fixed to the ring 111 actuates in a known way an assembly such as a diaphragm in order to set the latter upon turning of the ring 111. For example, the pin 112 may be connected to a rotary diaphragm ring which is connected to the blades of the diaphragm in a well-known manner for setting the exposure aperture, the diaphragm being wide open when the parts are at rest, as is well-known in single-lens reflex cameras. The rotary ring 111 has a toothed portion 113 meshing with a gear 114 which in turn meshes with a gear 115 which meshes with a toothed sector 117 supported for rotary movement about a stationary pin 116 carried by any suitable stationary part of the camera. The toothed segment or sector 117 carries a stop member 118. The motion-transmitting member 120 of FIG. 3, which corresponds to the motion-transmitting member 69 of FIG. 2, has a stop portion 119 in the form of an edge of the motion-transmitting member 120, and this stop portion 119 is located in the path of turning movement of the stop pin 118 to engage and stop the turning of the latter and thus stop the turning of the ring 111 so as to determine the setting of the diaphragm in the above example. Thus, the parts 113–117 form a drive means for driving the stop member 118 until it engages the stop portion 119 of the motion-transmitting member 120 which forms part of the exposure-determining structure of the embodiment of FIG. 3. The motion-transmitting member 120 is connected in the same way as the motion-transmitting member 69 to the bell crank 83, and this bell crank 83 actuates the same holding and scanning structure as shown in FIG. 2 and described above, so that this latter structure is not illustrated in FIG. 3. Moreover, the motion-transmitting member 120 has an extension 122 terminating in a bifurcated portion 121 receiving the pin 123 which is carried by the arm 71 of the manually operable means 72, so that in the embodiment of FIG. 3 it is the engagement of the pin 123 with the left-end of the notch in the bifurcated portion 121 which determines the point of engagement between the motion-transmitting member 120 and the arm 71. The elongated spring 75 is stretched between and connected to the arm 71 and the motion-transmitting member 120 in the manner shown in FIG. 3, and of course this arrangement corresponds to that of FIG. 2. Thus, in the embodiment of FIG. 3 also, the distance between the point of connection 74 of the spring 75 to the arm 71 and the turning axis of the lever 72 provided by the pin 73 is greater than the distance between this latter turning axis and the point of engagement between the motion-transmitting member 120 and the pin 123.

A pawl-and-ratchet means is provided in the embodiment of FIG. 3 for holding the motion-transmitting member 120 against movement resulting from the impact of the stop pin 118 against the edge 119, and this pawl-and-ratchet means includes the row of ratchet teeth 124 formed directly on the motion-transmitting member 120 as well as the pawl 126 which is turnable about a stationary pivot 125 carried by any suitable stationary part of the camera. The pawl 126 is fixed with an arm 127 which extends from the pawl 126 over the arm 71 and engages the upper end of this arm 71, as shown in FIG. 3. A spring 128 cooperates with the pawl 126 to urge the latter to turn into engagement with the ratchet teeth 124, and it is this spring which maintains the arm 127 in engagement with the arm 71, this arm 127 terminating in a free end portion 129 which is slightly curved in the manner indicated in FIG. 3.

When the operator desires to make an exposure with the embodiment of FIG. 3, the operator will again turn the manually operable means 72 in the direction of the arrow g, and of course as a result of the transmission of motion by the spring 75 the motion-transmitting member 120 will follow the movement of the arm 71. As was explained above in connection with FIG. 2, the initial increment of movement of the manually operable means does not result in any adjusting of the camera and all that happens during this time is that the releasable holding means is moved to its holding position where it arrests the pointer of the light meter and prevents further movement thereof during the subsequent operations. Thus, during the initial increment of movement of the lever 72 by the operator the pointer of the light meter will be gripped so as to be held stationary, and then during the subsequent movement of the manually operable means the structure operatively connected thereto will operate to cause the scanning means to scan the position of the pointer, and after engagement of the scanning means with the pointer of the light meter the motion-transmitting member 120 will no longer follow the movement of the lever 72. Thus, the stop portion 119 of the exposure-determining means 120 of FIG. 3 will have been placed in this way in a fully automatic manner in a position determined by the lighting conditions. The continued turning of the manually operable means 72 up to its end position will therefore result at this time in elongating of the spring 75 at an increased rate, as described above, and the pin 123 will move away from the inner end of the notch of the bifurcated portion 121 of the exposure-determining means 120, but the length of this bifurcated portion 121 is such that the pin 123 never moves out of the bifurcated portion 121.

Shortly before the arm 78 of the manually operable means reaches the pin 79, in the embodiment of FIG. 3, the upper end of the arm 71 slides along the upwardly curved free end portion 129 of the arm 127 which is fixed to the pawl 126, so that the spring 128 can now turn the pawl 126 in the direction of the arrow p until the pawl 126 engages the ratchet teeth 124, and thus the pawl-and-ratchet means 124, 126 prevents movement of the exposure-determining means 120 to the left, as viewed in FIG. 3, when the stop member 118 engages the edge 119.

Shortly before the arm 78 reaches the end of its movement in the direction of the arrow g in FIG. 3, this arm 78 will engage the pin 79 and turn the lever 80, but in a manner which is well-known in the art and which is not illustrated, the turning of the lever 80 will not immediately result in tripping of the shutter. Instead the ring 111 will first be released for turning movement in direction of the arrow n shown in FIG. 3, and thereafter the shutter will be automatically tripped. This type of construction is well-known in single-lens reflex cameras. Therefore, the turning of the arm 80 will first result in release of the ring 111 so that the pin 112 will act on the diaphragm ring to stop down the diaphragm, and the drive means 113–117 will act at this time to turn the gear sector 117 and thus the pin 118 in the direction of the arrow o until the pin 118 engages the edge 119, so that in this way the diaphragm will be automatically set to provide an aperture in accordance with the lighting conditions, and immediately thereafter the shutter will be tripped to make the exposure.

When the operator releases the manually operable means 72 of FIG. 3, after the exposure has been made, the spring 75 will immediately swing the arm 71 back to the position where the pin 123 engages the inner end of the notch of the bifurcated free end portion 121 of the extension 122 of the exposure-determining means 120. Then the spring 75 will act in the manner described above to return the parts to their starting positions, since in this case also the force acting in the direction of the arrow 103 is smaller than the force acting in the direction of the arrow 104. The return of the drive means 113–117 as well as the ring 111 to their initial positions is provided by cocking of the shutter in a manner well-known in the art. Thus, as is well-known in single-lens reflex cameras, when the shutter is cocked the diaphragm is opened up to its widest opening, and this will result in turning of the ring 11 in a direction opposite to that indicated by the arrow n, so that the drive means 113–117 will return to the illustrated position which will result in placing of the stop member 118 in its initial position.

It is therefore apparent that with all of the embodiments of the invention, the operator need exert only an extremely light pressure in order to make an exposure, while at the same time the structure is capable of automatically returning to its rest position when the operator releases the manually operable means.

Of course, the invention is not limited to the details of the embodiments described above, but can also be used with motion-transmitting members and drives constructed differently from those described above and shown in the drawing.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, manually operable means movable from a given starting position to a given end position; shutter-tripping means actuated by said manually operable means, when the latter is in the region of said end position thereof, for tripping a shutter of the camera; exposure-determining means participating at least partly in the determination of the extent to which film in the camera is exposed, said exposure-determining means being movable from a given starting position toward a given end position; light-responsive means operatively connected to said exposure-determining means for limiting the extent of movement thereof from said starting position toward said end position thereof in accordance with the lighting conditions; and elongated spring means extending between and connected to said manually operable means and said exposure-determining means for transmitting movement of said manually operable means to said exposure-determining means, said spring means being stressed to a given extent when said manually operable means and said exposure-determining means are both in said starting positions thereof, and said manually operable means and said exposure-determining means cooperating with said spring means for increasing the stress thereof beyond said given extent during movement of said manually operable means and said exposure-determining means from said starting positions thereof, whereby, when the operator releases said manually operable means after the latter has been moved to said end position thereof, said spring means will automatically return said manually operable means and said exposure-determining means respectively to their starting positions.

2. In a camera, in combination, manually operable means movable from a given starting position to a given end position; shutter-tripping means actuated by said manually operable means, when the latter is in the region of said end position thereof, for tripping a shutter of the camera; exposure-determining means participating at least partly in the determination of the extent to which film in the camera is exposed, said exposure-determining means being movable from a given starting position toward a given end position, and said exposure-determining means having a portion which engages a portion of said manually operable means when the latter and said exposure-determining means are respectively in said starting positions thereof; light-responsive means operatively connected to said exposure-determining means for limiting the extent of movement thereof from said starting position thereof in accordance with the lighting conditions; and elongated spring means extending between and connected to said manually operable means and said exposure-determining means for transmitting the movement of said manually operable means to said exposure-determining means, said spring means being stressed to a given extent when said manually operable means and said exposure-determining means are both in said starting positions and said spring means acting on said manually operable means and said exposure-determining means for urging said portions thereof respectively into engagement with each other, said manually operable means and said exposure-determining means cooperating with said spring means for increasing the stress thereof beyond said given extent during movement of said manually operable means and said exposure-determining means from said starting positions thereof and said light-responsive means stopping the movement of said exposure-determining means with said manually operable means before the latter reaches said end position thereof so that when said manually operable means is moved beyond the position it has when the movement of said exposure-determining means is terminated by said light-responsive means said portion of said manually operable means moves away from said portion of said exposure-determining means and the rate of increase in the stress of said spring means increases while said manually operable means is moved by the operator to said end position thereof for tripping the shutter, whereby, upon release of said manually operable means after tripping of the shutter said spring means will first automatically move said manually operable means into engagement with said exposure-determining means at said portions thereof, respectively, and will then automatically return said manually operable means and said exposure-determining means respectively to their starting positions.

3. In a camera, in combination, manually operable means movable from a given starting position to a given end position for tripping a shutter of the camera when said manually operable means is in the region of said end position thereof; exposure-determining means participating at least partly in the determination of the extent to which film in the camera is exposed, said exposure-determining means being movable from a given starting position toward a given end position and being operatively connected to a light-responsive structure of the camera which limits the extent of movement of said exposure-determining means from said starting position thereof in accordance with the lighting conditions; and an elongated spring extending between and connected to said manually operable means and said exposure-determining means for transmitting movement of said manually operable means to said exposure-determining means, said spring being under a given tension when both of said means are respectively in their starting positions, and both of said means cooperating with said spring for increasing the tension thereof during movement of both of said means from said starting positions thereof, respectively, whereby, when the operator releases said manually operable means after the latter has been moved to said end position thereof to trip the shutter of the camera, said spring will automatically return both of said means respectively to their starting positions.

4. In a camera as recited in claim 3, both of said means respectively including levers which engage each other in the starting positions of both of said means, respectively, and which are respectively turnable about a pair of parallel axes, said spring extending between and being connected to said levers and urging said levers into engagement with each other, the distance between the connection of said spring to the lever of said manually operable means and the turning axis of said manually operable means being greater than the distance between the connection of said spring to the lever of said exposure-determining means and the turning axis of said latter lever.

5. In a camera as recited in claim 3, both of said means respectively including levers which engage each other at a given point, and said levers being respectively turnable about a pair of predetermined axes, said spring extending between and being connected to said levers and urging them into engagement with each other at said point, the distance between the point of connection of said spring to said lever of said manually operable means and the turning axis of said latter lever and the distance between said point of engagement and the latter turning axis respectively forming first and second predetermined distances while the distance between the point of connection of said spring to the lever of said exposure-determining means and the turning axis thereof as well as the distance between said point of engagement and the latter turning axis respectively forming third and fourth predetermined distances, said first distance being greater than said third distance, and the ratio of said first distance to said second distance being greater than the ratio of said third distance to said fourth distance.

6. In a camera as recited in claim 3, said manually operable means including an elongated manually turnable lever turnable about a predetermined axis and said exposure-determining means including a motion-transmitting member which engages said lever at a predetermined point of engagement when both of said means are respectively in their starting positions, said spring extending between and being connected to said motion-transmitting member and said lever for urging the latter and said motion-transmitting member into engagement at said predetermined point of engagement, and the distance between the connection of said spring to said lever and the turning axis thereof being greater than the distance between said point of engagement and said turning axis.

7. In a camera, in combination, manually operable means movable from a given starting position to a given end position for tripping a shutter of the camera when said manually operable means is in the region of said end position thereof, said manually operable means upon moving from said starting position toward said end position moving first through an initial increment of movement and then through a subsequent movement subsequent to said initial increment of movement; exposure-determining means participating at least partly in the determination of the extent to which film in the camera is exposed, said exposure-determining means being movable from a given starting position toward a given end position; meter means adapted to be actuated in response to the lighting conditions and including a movable pointer; releasable holding means movable between a release position releasing said pointer for movement and a holding position holding said pointer against movement, said manually operable means cooperating during said initial increment of movement thereof with said releasable holding means for moving the latter from said release to said holding position thereof so that the pointer is held stationary during said subsequent movement of said manually operable means; scanning means for scanning the position of said pointer, said scanning means being operatively connected to said exposure-determining means for limiting the extent of movement thereof from said starting position toward said end position thereof in accordance with the lighting conditions; and elongated spring means extending between and connected to said manually operable means and said exposure-determining means for transmitting movement of said manually operable means to said exposure-determining means at least during said subsequent movement of said manually operable means, said exposure-determining means acting on said scanning means to move the latter into engagement with said pointer during transmission of movement of said manually operable means to said exposure-determining means by said spring means, said spring means being stressed to a given extent when said manually operable means and said exposure-determining means are both in their starting positions, and said manually operable means and said exposure-determining means cooperating with said spring means for increasing the stress thereof beyond said given extent during movement of said manually operable means and said exposure-determining means from said starting positions thereof, thereby when the operator releases said manually operable means after the camera shutter has been tripped, said spring means will automatically turn said manually operable means and said exposure-determining means respectively to their starting positions.

8. In a camera as recited in claim 7, said manually operable means including a first portion which moves during movement of said manually operable means all the way from said starting to said end position thereof and a second portion which moves only during said subsequent movement of said manually operable means, said second portion of said manually operable means being located in the path of movement of said first portion thereof to be engaged and moved by said first portion after said first portion of said manually operable means has moved through said initial increment of movement of said manually operable means, said first portion of said manually operable means being operatively connected to said releasable holding means for actuating the latter and said second portion of said manually operable means being connected to said spring means; and second spring means operatively connected to said first portion of said manually operable means for urging the latter to return to said starting position of said manually operable means.

9. In a camera, in combination, manually operable means movable from a given starting position through an initial increment of movement and then through a subsequent movement to a given end position, said manually operable means when in the region of said end position thereof tripping a shutter of the camera; exposure-determining means participating at least partly in the determination of the extent to which film in the camera is exposed, said exposure-determining means being movable from a given starting position toward a given end position; meter means adapted to be actuated in response to the lighting conditions and including a movable pointer; releasable holding means movable between a release position releasing said pointer for movement and a holding position holding said pointer against movement; scanning means cooperating with said pointer for scanning the position thereof, said scanning means being operatively connected to said exposure-determining means for limiting the movement thereof from said starting position thereof in accordance with the lighting conditions; and elongated spring means extending between and connected to said manually operable means and said exposure-determining means for transmitting movement of said manually operable means to said exposure-determining means, said spring means during said initial increment of movement of said manually operable means transmitting movement thereof to said exposure-determining means and through the latter to said releasable holding means for moving the latter from said release to said holding position during said initial increment of movement of said manually operable means, and said spring means transmitting movement of said manually operable means through said exposure-determining means to said scanning means during said subsequent movement of said manually operable means, said exposure-determining means and said scanning means continuing to move during said subsequent movement of said manually operable means until said scanning means engages said pointer whereupon the operator then continues to move said manually operable means in opposition to said spring means until the camera shutter is tripped in the region of the end position of said manually operable means, whereby upon release of said manually operable means said spring means will return the latter and said exposure-determining means respectively to their starting positions and will also move said scanning means through said exposure-determining means away from said pointer and will then act through said exposure-determining means on said holding means to move the latter from said holding to said release position thereof.

10. In a camera as recited in claim 7, said scanning means being incapable of engaging said pointer before said holding means is in said holding position thereof.

11. In a camera as recited in claim 1, said light-responsive means including a meter adapted to be actuated in accordance with the lighting conditions and including a movable pointer, a holding member guided for movement between a release position releasing said pointer for movement and a holding position engaging said pointer to hold the latter against movement, a pin fixed to and extending from said holding member, a rotary member formed with a slot receiving said pin and said slot having a first portion cooperating with said pin to move said holding member to said holding position during an initial turning of said rotary member and a second portion cooperating with said pin to hold the latter and said holding member therewith in a position restraining said pointer against movement during a subsequent portion of movement of said rotary member, and said light-responsive means also including a scanning member for scanning the position of said pointer and connected to said exposure-determining means for moving with the latter until said scanning member engages said pointer, said rotary member turning to place said holding member in engagement with said pointer during an initial increment of movement of said manually operable means before said scanning member can move into engagement with said pointer.

12. In a camera, such as a single-lens reflex camera, wherein, when the shutter is tripped, a part of the camera such as a diaphragm thereof is placed in an exposure-determining position before the shutter of the camera is actuated to make the exposure, in combination, manually operable means movable from a given starting position to a given end position; shutter-tripping means actuated by said manually operable means, when the later is in the region of said end position thereof, for tripping a shutter of the camera; exposure-determining means participating partly in the determination of the extent to which film in the camera is exposed, said exposure-determining means being movable from a given starting position toward a given end position and including a stop portion; a stop member; drive means operatively connected to said stop member for moving the latter into engagement with said stop portion of said exposure-determining means, said drive means being adapted to be connected to a part of the camera such as a diaphragm thereof for placing the latter in an exposure-determining position when said stop member is driven by said drive means into engagement with said stop portion of said exposure-determining means and said drive means being adapted to be set into operation upon actuation of said shutter tripping means before the latter trips the shutter; light-responsive means operatively connected to said exposure-determining means for limiting the extent of movement thereof from said starting position thereof in accordance with the lighting conditions; elongated spring means extending between and connected to said manually operable means and said exposure-determining means for transmitting movement of said manually operable means to said exposure-determining means, said spring means being stressed to a given extent when said manually operable means and said exposure-determining means are both in their starting positions, and said manually operable means and said exposure-determining means cooperating with said spring means for increasing the stress thereof beyond said given extent during movement of said manually operable means and said exposure-determining means from said starting positions thereof, whereby, when the operator releases said manually operable means after the latter has been moved to said end position thereof, said spring means will automatically return said manually operable means and said exposure-determining means respectively to their starting positions; and releasable pawl-and-ratchet means cooperating with said exposure-determining means for preventing movement thereof by engagement of said stop member with said stop portion of said exposure-determining means, said pawl-and-ratchet means being maintained in a rest position by said manually operable means until the latter is in the region of said end position thereof whereupon said manually operable means releases said pawl-and-ratchet position for movement to an operative position restraining said exposure-determining means against movement by engagement of said stop member with said stop portion of said exposure-determining means.

13. In a camera as recited in claim 12, said pawl-and-ratchet means including ratchet teeth carried by said exposure-determining means and a turnable pawl member having a portion engaging said manually operable means except when the latter is in the region of said end position thereof.

14. In a camera as recited in claim 13, additional spring means cooperating with said pawl member for urging the latter into engagement with said ratchet teeth when said manually operable means is in the region of said end position thereof.

References Cited in the file of this patent
UNITED STATES PATENTS

| | | |
|---|---|---|
| 2,061,909 | Karg | Nov. 24, 1936 |
| 2,949,070 | Frost | Aug. 16, 1960 |
| 2,982,190 | Fischer | May 2, 1961 |
| 3,026,783 | Winkler | Mar. 27, 1962 |